Figure 1:
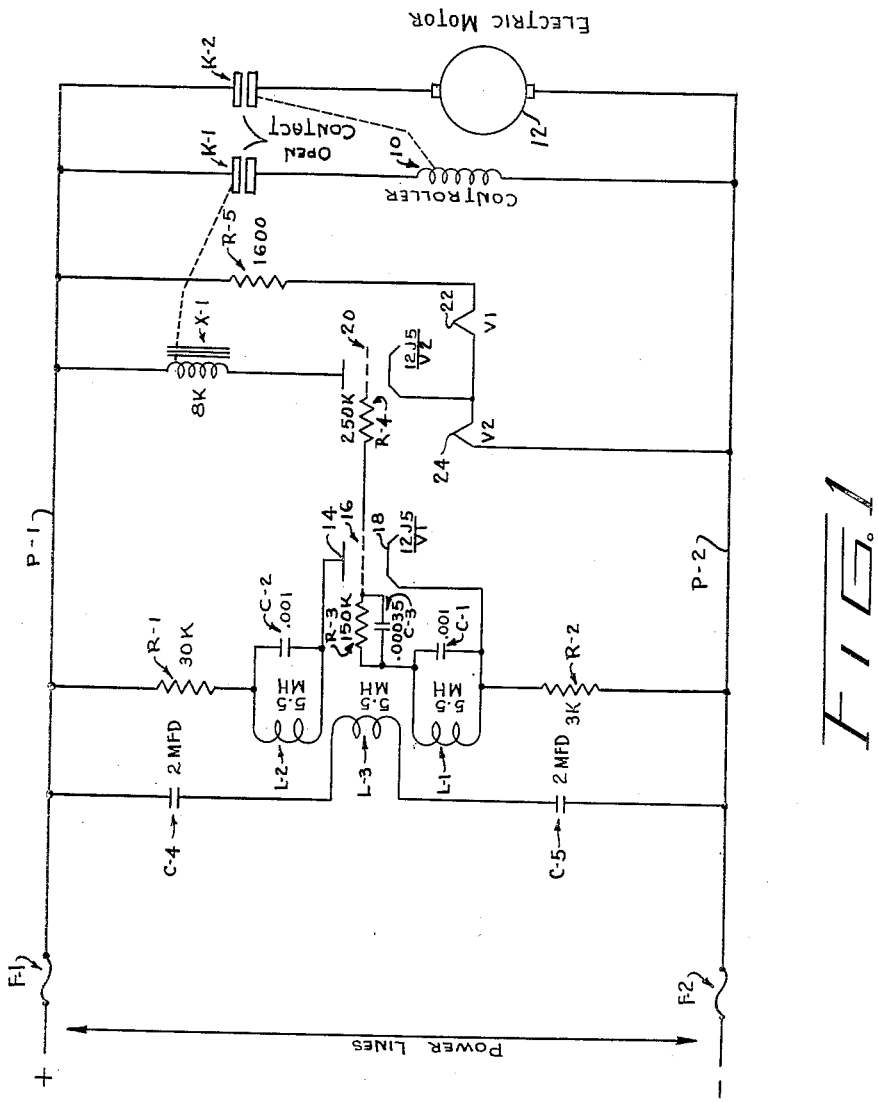

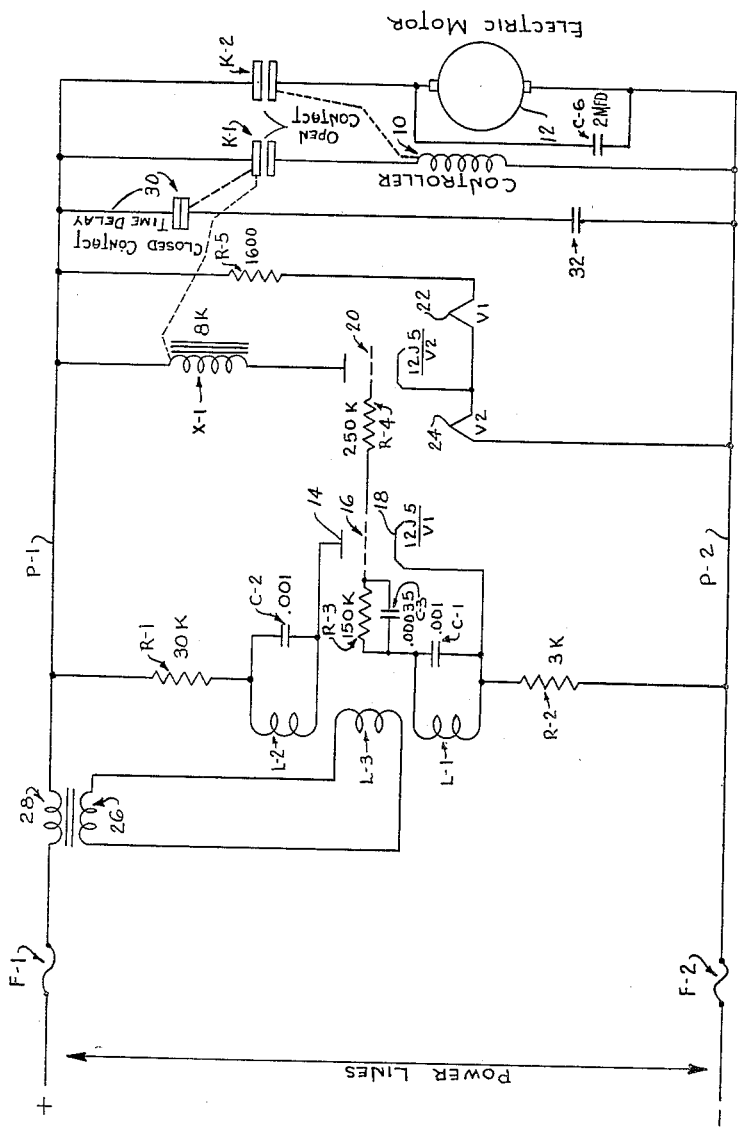

Patented Mar. 20, 1951

2,545,690

UNITED STATES PATENT OFFICE 2,545,690

MOTOR PROTECTIVE CIRCUIT

Joseph Di Giovanni, Fairview, N. J., assignor to United Elevator Service, Inc., New York, N. Y.

Application August 18, 1950, Serial No. 180,143

12 Claims. (Cl. 318—447)

1

The present invention relates to a circuit for protecting a motor so that rotation thereof is relatively instantly halted upon the failure, for any reason, of the current supplied to the motor.

Direct current shunt and compound motors have had many industrial applications in which the protective circuit herein proposed may be most advantageously used.

Examples of these are the motors which operate conveyor belts, rolling mills, freight hoists, passenger elevators, etc.

In these motor applications, and particularly those in which are operated freight hoists and passenger elevators, should there be a failure such that the current supplied to the motor is interrupted, for example, the failure of a power line use, although it is imperative that the motor be immediately brought to rest, this will not at all times be accomplished.

The motor, under certain conditions, by reason of its coasting action, may, in effect, become a generator and supply sufficient voltage to the controller to keep several relays and the motor brake energized.

Thus, particularly in the operation of a hoist or elevator, a resulting partly operative controller and an open or inoperative brake may become extremely hazardous in that the hoist or elevator under certain conditions, of the failure of the current supplied to the motor, may continue to be driven because of the failure of a line fuse or other reason.

In an elevator installation, under normal conditions of power line supply, with the elevator driving the motor, the motor is able to maintain its normal speed because it (the motor) acts as a generator, developing its rated horsepower as a generator, converting mechanical energy into electrical energy.

However, upon power failure to the motor, it (the motor) cannot develop its rated horsepower as a generator, because the motor loses the heavy path over the power lines and can only generate what the controller would pass, one or two amperes. Under this condition, the elevator will speed away, thereby creating a dangerous condition.

With the elevator driving the motor, a similar dangerous condition may arise should a controller contact fail. The power lines will keep the controller and brake energized while the motor would then be unable to hold back the load.

The present invention therefore contemplates the provision of a means for overcoming these dangers or hazards by providing a circuit through

2 which the armature circuit of a motor will be instantly opened upon the failure for any reason, such as, fuse failure, of the current supplied to the motor or a failure in the controller circuit.

By means of the circuit here contemplated, the source of an extraneous voltage is removed thereby allowing the spring loaded brake, as in an elevator system, to operate and stop the motor.

In order to enable those skilled in the art to practice my invention, I have herein described examples thereof to which I have appended drawings thereof, in which Fig. 1 is a schematic wiring diagram of a motor protective circuit according to my invention Fig. 2 is a schematic wiring diagram of a modification of my invention.

Referring now to the drawings and more particularly to Fig. 1, I have illustrated therein a circuit for protecting and preventing the running away of a direct current motor operating the elevator car in an elevator system and which employs vacuum tubes and a relay for opening the circuit in which the controller 10 of the motor 12 is arranged.

The invention here contemplated is exemplified by the action of an oscillator circuit employing a triode electronic vacuum tube having a tuned plate and a tuned grid, and is based on two characteristics affecting oscillator circuits, namely, (1) an oscillator circuit will cease oscillating when the Q of a tightly coupled load circuit, that is, the inductive reactance divided by the resistance is sufficiently reduced, and (2) the Q reducing action or damping of the power mains is much greater than that due to the direct current motor and its associated controller.

Thus I provide a normally non-oscillating circuit so arranged that the Q factor of a load circuit tightly coupled thereto is reduced sufficiently so that this Q reducing action or damping of the power mains is much greater than that which results from the direct current motor and its associated controller.

In the schematic diagram illustrated, I have designated the sizes of the capacitors, coils and resistances that may be used in an elevator system employing my motor protective circuit.

Across the power lines P1 and P2, I arrange a circuit, which I shall herein term the load or control circuit, comprising the coil L3 which is tightly coupled to coils L1 and L2 of the oscillator circuit.

In this load or control circuit on each side of the load coil L3 between the mains P1 and P2, I insert the capacitors C4 and C5 which are of magnitude to block direct current to the load coil L3.

Across the mains P1 and P2 in parallel with the load or control circuit to which it is tightly coupled, I arrange an oscillator circuit, which normally is non-oscillating.

There is included in this oscillator circuit a conventional electronic vacuum triode tube V1. The plate 14 of this tube is connected to and tuned by means of the tank circuit comprising the coil L2 and the capacitor C2. The grid 16 of V1 is connected through the circuit formed by the resistance R3 and capacitor C3 to the tuned tank circuit comprising the coil L1 and the capacitor C1.

The cathode 18 of V1 is connected in parallel with the latter tank circuit through the resistance R2 to the main P2.

The grid leak bias of V1, when it is oscillating is obtained by means of the resistance R3 and the capacitor C3.

The resistors R1 and R2 are selected of magnitude to limit the current through the tube V1 when it is not oscillating and to set the grid bias on the grid 20 of the relay tube V2 which also is a conventional thermionic vacuum triode which is the same type and size as tube V1.

The grid 20 of tube V2 is connected to the grid 16 of V1 through the resistance R4. Thus the grid leak bias developed on the grid 16 of V1 is transferred to the grid 20 of V2 through this isolating resistor R4 normally cutting off the flow of plate current in the tube.

Thus in normal operation the oscillator circuit having the tube V1 is non-oscillating so that tube V2 is then conducting to permit the relay X1 to be energized. Energizing the relay X1 closes the contact K1 thereby closing the circuit to the controller 10.

The relay X1 when energized closes the contact K1 which is normally open.

When the contact K1 is closed, the controller 10 may then be operated and as is well known, the contact K2 in the motor circuit is governed by the action of the controller 10. The filaments 22 and 24 of the thermionic vacuum tubes V1 and V2 are arranged across main lines P1 and P2 with the resistor R5 in their circuit, which resistor is provided to limit the filament current of tubes V1 and V2 to their rated value.

In each line P1 and P2, for example, there is usually provided the power line fuses F1 and F2. When these fuses are intact, the damping effect on V1, through the load or control circuit, is sufficient to keep that tube from oscillating, and as pointed out, tube V2 is fully conducting to energize the relay X1 which closes contacts K1 which in turn completes the controller circuit. Thereby, the controller 10 and motor 12 are permitted to operate in their normal manner.

Should there be a failure of current supply to the controller and motor circuit, as for example by the opening of either fuse F1 or F2, there will be a sufficient reduction in the damping on tube V1 through the load or control circuit, to cause tube V1 to oscillate, the oscillator circuit being fed at the same time by the voltage generated by the motor 12, which now may be acting as a generator, in which case it would have energized relay X1 to otherwise keep contact K1 closed.

The grid leak bias developed on grid 16 will be transferred to the grid 20 to cut off the flow of plate current in the tube V2.

Such interruption of plate current on tube V2 causes relay X1 to drop out and open contact K1, which opens the closed controller circuit. When the controller 10 drops out the motor 12 armature circuit contacts K2 open.

This opening of the armature circuit of the motor immediately stops its rotation and disables the controller and permits the elevator brake to operate at once.

Thus in the case of failure of the supply of current in the power line as by the failure of a fuse, the motion of the motor is stopped, comparatively instantly, that is in the time required for the relays X1 and the controller 10 to drop out and the brake to close.

In the modification of my invention just described, protection is obtained against failure in the supply of current up to the controller itself, that is the contacts K1.

Referring now to Fig. 2, I have illustrated a modification of my invention in which the power line itself is used to control the oscillation of tube V1 so that any failure in the controller or in the armature circuit of the motor as well as failure in the power lines, is protected against.

In Fig. 2, the load coil L3, oscillator circuit employing tube V1, relay tube circuit V2 and X1, controller and contacts K1 and motor and contacts K2 are the same as those illustrated in Fig. 1 and described with reference thereto. I shall not repeat such description except as required for an understanding of the modification illustrated in Fig. 2.

In this modification I couple the load coil L3 to the primary 26 of the transformer, the secondary 28 of which is connected in the power line P1.

As pointed out with reference to the protective circuit illustrated in Fig. 1, the oscillator circuit is normally non-oscillating because of the damping effect of coil L3.

In the modification illustrated in Fig. 2, alternating voltage induced by the oscillator circuit in the load coil L3 is applied to the primary winding 26 and current will flow through it and produce an alternating flux in the magnetic core of the transformer. This alternating flux generates a voltage in each winding 26 and 28. The voltage generated in the winding 26 is called the counter E. M. F. which opposes the applied E. M. F.

The current flowing through the winding 26, under this condition, is called the exciting current and is a relatively small percentage of the applied E. M. F.

Since a circuit is completed through the secondary winding 28, the source of power supply and the motor 12, this would be the equivalent of shorting the ends of the winding 28, full load current flowing in the secondary 28.

Full load current in the secondary 28 sets up a flux in the magnetic core which is opposite in direction to the flux produced therein by the winding 26. This action reduces the counter E. M. F. induced in the winding 26 so that the effective impedance of the winding 26 is at once lowered, allowing more current to flow through it. Thus a low impedance path is provided for the load coil L3 causing it to effectively dampen the oscillator circuit, as previously described with reference to Fig. 1, thereby permitting relay X1 to be energized and close contact K1.

Should either fuse F1 or F2 fail or current to the controller be interrupted for any reason or power be interrupted at any point, current flowing in the secondary winding 28 will be interrupted and thus there will not be generated a flux that will oppose that generated by the secondary winding, 26. The impedance of the circuit will be raised so that the load coil L3 will not then effectively dampen the oscillator circuit, which will then become oscillating.

The modification now being described in Fig. 2 is of extreme importance because the circuit now being described will protect against any failure in the controller itself, for example a bad contact in the controller, a broken flexible lead or any other controller failure, which controller failures are much more frequent and therefore protection against such failures are much more important than protection against a failure in the power line, which this circuit additionally serves to protect against.

Under such circumstances, as previously described, the tube V1 will commence to oscillate and block tube V2 dropping relay X1 and opening contacts K1 to open the controller circuit as described hereinabove.

When the motor is at rest, it does not require any protection by my circuit, since contacts K2 are open. However, a closed circuit must be maintained before the motor is started and therefore I provide the normally closed contacts 30 in the circuit of which I provide the capacitor 32, which blocks direct current through the contacts but permits the RF of the oscillator circuit to pass.

Contact 30 is a timed contact, so that it will open after contact K1 is closed.

In order to protect the motor brushes and armature themselves, I couple across the motor the condenser C6 which completes the low impedance path across the armature.

The advantages of the circuit illustrated in Fig. 2 permit a low impedance controller or motor, possible change of controller impedance or resistance by the additional switches, condensers, etc., without affecting the circuits by the maintenance of a low impedance path for the pick-up coil in the load or control circuit in case of line failure.

The circuit illustrated in Fig. 2 in addition may be used with the largest conceivable motor, having a comparatively low impedance.

It will be recognized that I have provided in an electrical network having a motor circuit, particularly one in which the motor is a direct current shunt or compound motor, a protective system having a circuit means for opening said motor circuit, which circuit means is normally inoperative and a load or control circuit coupled to this circuit means for making said circuit means operative upon failure, for any reason of current supplied to the motor circuit.

I have only shown such details of a network of circuits as will be required for an understanding of my invention and while I have shown in some detail specific embodiments of my invention, I do not intend to be limited thereto but desire to claim my invention as broadly as the appended claims and the prior art will permit.

I claim.

1. In an electrical network; power transmission lines; an electric motor and a controller for said motor across said power transmission lines; an oscillator circuit across said power transmission lines having an electronic tube; a relay circuit across said power transmission lines and having a second electronic tube; the grid of said first tube being connected to the grid of said second tube; said first tube being normally non-oscillating and said second tube being normally conducting; said relay circuit opening the circuit for said controller upon the second tube becoming non-conducting; and a control circuit across said power lines for making the oscillator circuit oscillating upon failure of the current supply to the controller, said second tube becoming non-conducting upon oscillation of the oscillator circuit.

2. In an electrical network of the character described; a motor circuit having a controller therein; a contact in said controller circuit for closing and opening said motor circuit; an oscillator circuit having a relay controlling said contact, said oscillator circuit being normally non-oscillating whereby said contact may be closed to close the motor circuit; and a control circuit coupled to said oscillator circuit for making said oscillator circuit oscillating upon failure of current in the controller circuit to drop out said relay.

3. In an electrical network of the character described; a motor circuit having a means for closing and opening said motor circuit; a relay circuit having a relay for controlling said closing and opening means and an electronic tube, said electronic tube being normally conductive whereby said relay is energized to close said motor circuit; an oscillator circuit normally non-oscillating and coupled to said relay circuit, said electronic tube being conducting upon said oscillator circuit being non-oscillating; and a control circuit coupled to said oscillator circuit for making said oscillator circuit oscillating upon failure of current in the motor circuit whereby said electronic tube becomes non-conducting to cause said relay to be de-energized.

4. In an electrical network of the character described; a motor circuit having a motor, a contact in said motor circuit, a controller circuit having a controller for said motor, a second contact in said controller circuit, said first mentioned contact operated by said controller; a relay circuit having an electronic tube and a relay controlling said second mentioned contact in the controller circuit, said electronic tube being normally conducting to permit the relay to be energized; an oscillator circuit having a second oscillator tube, said second electronic tube having a tuned plate and a tuned grid, said oscillator circuit being normally non-oscillating and said first electronic tube being conducting upon said oscillator circuit being non-oscillating, the grid of said first electronic tube being connected to the grid of said second electronic tube; and a control circuit coupled to said oscillator circuit for making said oscillator circuit oscillating upon failure of current supply in said motor circuit or said controller circuit.

5. In an electrical network of the character described having power transmission lines forming a power circuit; a motor circuit across said power lines and closed for operating the motor therein; a normally non-oscillating oscillator circuit for opening the closed motor circuit upon said oscillator circuit becoming non-oscillating; and a transformer having its primary in a power transmission line and its secondary of the transformer for making said oscillator circuit oscillating upon failure of current in the transmission lines.

6. In an electrical network of the character described, a power transmission circuit, a motor circuit having a means for closing and opening said circuit; a relay circuit normally conducting, and controlling said means; an oscillator circuit coupled to said relay circuit and normally non-oscillating, said relay circuit becoming non-conducting upon said oscillator circuit becoming oscillating; a control circuit for making said oscillator circuit oscillating; and a transformer having its primary in said power transmission circuit and its secondary in said control circuit, said transformer, upon failure of current supplied in said motor circuit causing said control circuit to make oscillating the oscillator circuit.

7. In an electrical network; power transmission lines; a motor; a circuit normally closed, for said motor across said power transmission lines; means in said motor circuit for opening said motor circuit; an oscillator circuit across said power transmission lines, said oscillator circuit being normally non-oscillating, said oscillator circuit coupled to said motor circuit to operate said means and open said motor circuit upon said oscillator circuit becoming oscillating; and a control circuit across said power transmission lines and tightly coupled to said oscillator circuit to make said oscillator circuit oscillating upon interruption of either the motor circuit or the power transmission lines.

8. In an electrical network of the character described; a power circuit having a first transmission line and a second transmission line; a motor having a controller therefor; a circuit for said motor and controller across said transmission lines; a relay circuit across said transmission line, said relay circuit having in series therein a relay and an electronic tube, said relay for closing and opening said motor circuit; a second electronic tube, the anode of said electronic tube connected through a tuned tank circuit to one of the transmission lines, the cathode of said second electronic tube connected through a second tuned tank circuit to the other of said transmission lines and the grid of said second electronic tube connected to the grid of said first mentioned electronic tube; and an inductive circuit across said transmission lines and inductively coupled between the tuned tank circuits, whereby the second electronic tube is normally non-oscillating, said first electronic tube being conducting upon said second electronic tube being non-oscillating and said first electronic tube being non-conducting upon oscillation of said second electronic tube, said second electronic tube becoming oscillating upon interruption of either the power circuit or the circuit for said motor and controller.

9. In an electrical network of the character described; a power circuit having a first transmission line and a second transmission line; a motor having a controller therefor; a circuit for said motor and controller across said transmission lines a relay circuit across said transmission line, said relay circuit having in series therein a relay and an electronic tube, said relay for closing and opening said motor circuit; a second electronic tube, the anode of said electronic tube connected through a tuned tank circuit to one of the transmission lines, the cathode of said second electronic tube connected through a second tuned tank circuit to the other of said transmission lines and the grid of said second electronic tube connected to the grid of said first mentioned electronic tube; an inductive circuit inductively coupled between the tuned tank circuits; and a transformer, the primary of said transformer arranged in one of the transmission line and the secondary of said transformer arranged in the inductive circuit, said second electronic tube normally non-oscillating, said first electronic tube being conducting upon said second electronic tube being non-oscillating and said first electronic tube being non-conducting upon oscillation of said second electronic tube, said second electronic tube becoming oscillating upon interruption of either the power circuit or the circuit for said motor and said controller.

10. In an electrical network of the character described; a power circuit having a first transmission line and a second transmission line; a means for interrupting each transmission line arranged therein; a motor and a controller therefor; a circuit for said motor and controller across the transmission lines; and a protective circuit across said power lines having an oscillator, said oscillator normally in non-oscillating condition, a relay for controlling the motor circuit and an electronic tube in series with said relay and connected to said oscillator circuit, said tube normally conducting and non-conducting upon oscillation of said oscillator circuit; said oscillator circuit as well as said relay and electronic tube arranged across said transmission lines between the said transmission line interrupting means and the motor circuit.

11. In an electrical network of the character described, a power circuit; a motor; a circuit normally closed for said motor across said power circuit; a relay circuit across said power circuit; a relay in said relay circuit; said relay circuit normally conductive to energize said relay; means in said motor circuit for closing and opening the motor circuit; said opening and closing means operated by said relay to close said means upon energizing the relay and to open said means upon deenergizing the relay; and a control circuit having means therein for making said relay circuit non-conductive to deenergize said relay and open said normally closed motor circuit upon failure of the line voltage in said power circuit.

12. In an electrical network; power transmission lines; means in said power transmission lines for interrupting the said lines; a motor; a circuit across said power transmission lines for said motor, said circuit for said motor being normally closed; means in said motor circuit for opening said motor circuit; an oscillator circuit across said transmission lines, said oscillator circuit being normally non-oscillating, said oscillator circuit being coupled to said motor circuit to operate said means and open said motor circuit upon said oscillator circuit becoming oscillating; and a control circuit across said power transmission lines and tightly coupled to said oscillator circuit to make said oscillator circuit oscillating upon interruption of either the motor circuit or the power transmission lines; said oscillator circuit arranged across said power transmission lines between said power transmission line interrupting means and the motor circuit.

JOSEPH DI GIOVANNI.

REFERENCES CITED

The following references are of record in the file of this patent:

UNITED STATES PATENTS

| Number | Name | Date |
| --- | --- | --- |
| 850,211 | Case | Apr. 16, 1907 |
| 2,145,909 | Zwickl | Feb. 7, 1939 |